UNITED STATES PATENT OFFICE.

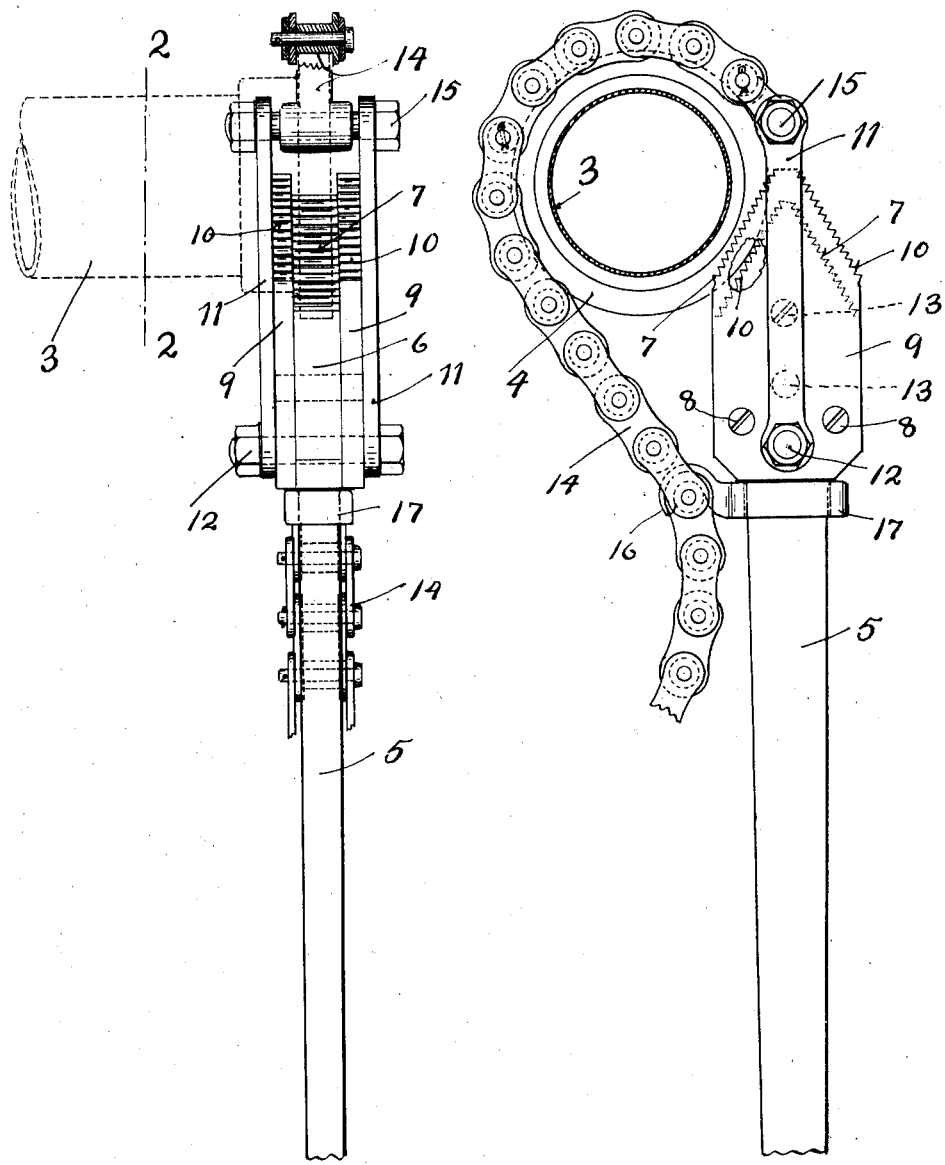

ELMORE W. ORR, OF MINNEAPOLIS, MINNESOTA, ASSIGNOR OF ONE-HALF TO WILLIAM J. ANTHONY, OF MINNEAPOLIS, MINNESOTA.

PIPE AND FLANGE WRENCH.

1,341,069.  Specification of Letters Patent.  Patented May 25, 1920.

Application filed September 16, 1918. Serial No. 254,165.

*To all whom it may concern:*

Be it known that I, ELMORE W. ORR, a citizen of the United States, residing at Minneapolis, in the county of Hennepin and State of Minnesota, have invented certain new and useful Improvements in Pipe and Flange Wrenches; and I do hereby declare the following to be a full, clear, and exact description of the invention, such as will enable others skilled in the art to which it appertains to make and use the same.

My invention has for its object to provide an extremely simple and highly efficient combination pipe and flange wrench; and to the above ends, consists of the novel devices and combinations of devices hereinafter described and defined in the claims.

The improved wrench is adapted to be made in various different sizes but is particularly intended to be made in large sizes for use on large pipe, such, for example, as large steam mains which usually have coupling flanges screwed onto the ends thereof.

The improved wrench is illustrated in the accompanying drawings wherein like characters indicate like parts throughout the several views. Referring to the drawings:

Figure 1 is a plan view of the improved wrench showing the same applied to a flange of a large pipe, the said pipe being indicated by dotted lines; and Fig. 2 is a section taken on the line 2—2 of Fig. 1, the pipe being here shown in full.

The pipe is indicated by the numeral 3 and its detachable flange by the numeral 4. The wrench has a strong handle bar 5 which, at its pipe engaging end, is in the form of a flat plate 6 preferably formed with reversely beveled edges that have teeth or serrations 7. Rigidly secured to the opposite faces of the plate 6 by screws 8 or other suitable devices, are pipe engaging plates 9 also preferably formed with reversely beveled edges having teeth or serrations 10. Preferably, the lines of the teeth 7 and 10 are parallel, but offset so that the teeth 10 project outward a considerable distance beyond the teeth 7.

A pair of strong metal links 11 are placed, one on each side of the outer plates 9 and are detachably and adjustably pivoted thereto and to the plate 6 by a nut-equipped bolt 12 that is adapted to be passed through any one of several longitudinally spaced holes 13 formed in the said plates 6 and 9. A strong link chain 14 at one end, is pivotally connected by a nut-equipped bolt 15 to the free ends of the two links 11. Any one of the links of the chain 14 may be anchored to the hooked end 16 of an anchor bracket 17 which, as shown, is loosely telescoped onto the handle 5 and is stopped against the ends of the plates 9.

The use of this improved wrench is probably obvious from the drawings, but the following brief description is thought desirable.

When the wrench is to act upon the flange 4 of the pipe the serrated edges of the plate 9 are placed straddle thereof and the serrated edge 7 of the central plate 6 is directly engaged with the periphery of said flange. The chain 14 is tightly drawn around the flange 4 and anchored to the hook 16, as best shown in Fig. 2. When this is done there may be a peripheral movement of the handle 5 and plates 6 and 9 on the bolt 12 and this permits the serrated edge of the plate 6 to be forced into tight clamping engagement on the flange 4. When the lever 5 is then forced in a clockwise direction in respect to Fig. 2, its serrations will tightly bite on the flange 4. The anchored chain 14 then serves as a base of re-action to keep the said serrations tightly pressed against the flange with a force that increases as the force is increased on the lever. The chain, of course, affords a large range of adjustability to pipe flanges of different diameter. However, it is sometimes desirable in pipes that vary greatly in diameter, and especially in very large pipes, to adjust the links 11 for great projection, which, obviously, is done by placing the bolt 12 in one of the holes 13 nearer to the ends of the plates 6 and 9. Frequently these pipe flanges are provided with bolt holes and sometimes it is desirable to detach the chain and to insert the bolt 15 directly through one of such bolt holes in anchoring the wrench for action. However, the chain, for most purposes, is desirable because, without removing the chain or readjusting it, the wrench can be loosened and again applied, at will, so that the rotary movement of the flange can be continued at a good rate of speed.

In using the wrench directly on the pipe rather than on the flange thereof, the chain will be applied, as described, but the serrated edges 10 of the plate 9 will then act upon the pipe.

In the use of the wrench on the flange of a pipe, as first described, the plates 9, even then perform a useful function in that they keep the serrated edge 7 of plate 6 properly positioned for action on the flange.

The arrangement of serrations 7 and 10 in the diverging arrangement and on opposite sides of the wrench, is desirable because it makes the wrench reversible or usable either side to, but in some instances the wrench might be provided with these serrations on one side only which, obviously, would be within the scope of my invention.

What I claim is:

1. A wrench of the kind described comprising a lever, intermediate and outside plates rigidly secured to said lever and provided with reversely oblique serrated edges, the serrated edges of said outer plate projecting beyond the serrated edge of said inner plate, a pair of links pivotally connected to said plates with their free ends projecting beyond the said plates so that the said links may swing from one side to the other of the head made up of said serrated plates, a chain connected to the free ends of said links, and means for anchoring the free portion of a chain to said lever.

2. A wrench of the kind described comprising a lever, intermediate and outside plates rigidly secured to said lever and provided with oblique serrated edges, the serrated edges of said outer plates projecting beyond the serrated edge of said inner plate, a pair of links pivotally connected to said plates, a chain connected to the ends of said links, and a bracket applied on said lever and having a hook end affording an anchor engageable with intermediate links of said chain, the pivotal connection between said links and said plates being afforded by a bolt, and the said plates having longitudinally spaced holes through any of which said bolt can be passed to adjustably pivot said links to said plates.

In testimony whereof I affix my signature in presence of two witnesses.

ELMORE W. ORR.

Witnesses:
CLARA DEMAREST,
BERNICE G. BAUMANN.